3,512,014
TRIGGER CIRCUITS
Edwin Garth Brumby, Stafford, and Jack Blanchard, Loughborough, England, assignors to The English Electric Company Limited, Strand, England, a British company
Filed Sept. 8, 1966, Ser. No. 577,873
Claims priority, application Great Britain, Sept. 8, 1965, 38,362/65
Int. Cl. H03k *17/00*
U.S. Cl. 307—252                       2 Claims

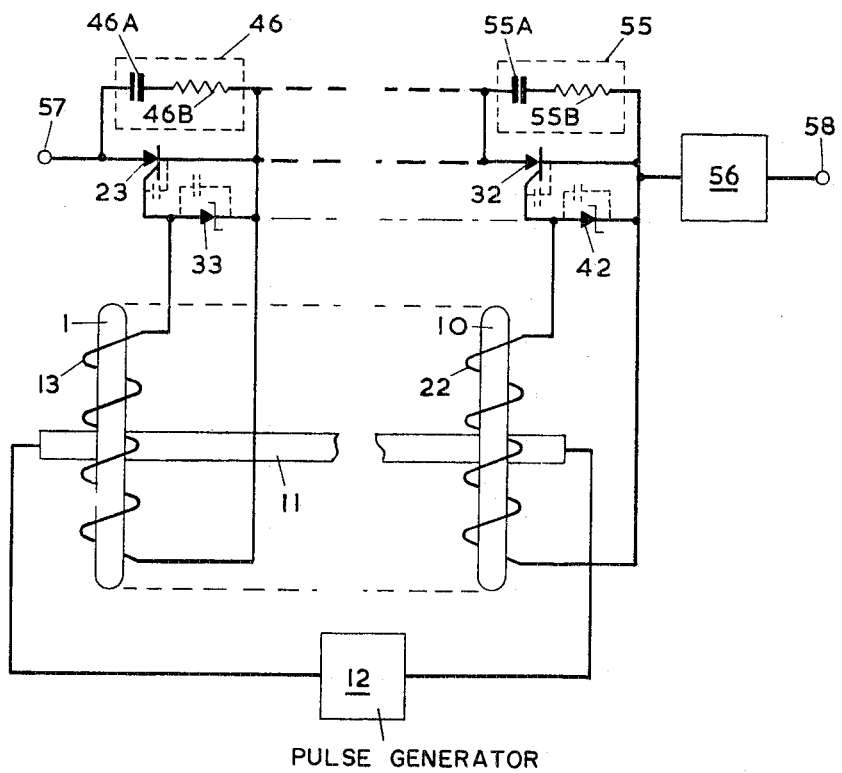
APPLICANTS
Edwin Garth Brumby
and Jack Blanchard
BY
 Misegades & Douglas
ATTORNEYS United States Patent Office 3,512,014
Patented May 12, 1970

ABSTRACT OF THE DISCLOSURE

This invention relates to a circuit for firing a number of series and/or parallel connected thyristors and embodies a like number of saturable magnetic cores each having a winding coupled across the gate and cathode electrodes of the corresponding one of the thyristors, the magnetic cores all being threaded by a single primary conductor connected to a pulse generator. In this manner, by pulsing the conductor from the pulse generator all the thyristors in the series string are simultaneously fired. The rise time of the firing pulse thus produced is rendered extremely fast by a tuned circuit embodied in each thyristor firing circuit.

---

This invention relates to trigger circuits, and in particular relates to a circuit for simultaneously firing a plurality of controlled rectifiers, e.g. thyristors.

From one aspect, the present invention consists in a circuit for firing a plurality of series and/or parallel connected controlled rectifiers, comprising a pulse generator, a single conductor connected to the pulse generator, a plurality of magnetic cores extending around, and spaced apart along, the conductor, and a winding on each core inductively coupled to the conductor, wherein each of the windings is separately connected across the gate and cathode electrodes of a corresponding one of said plurality of rectifiers constituting a tuned circuit with the gate-cathode self-capacitance, whereby, in response to the application to said conductor of a current impulse of sufficient magnitude to saturate the magnetic cores firing pulses are generated in the windings and are simultaneously applied to all the rectifiers.

A Zener diode may conveniently be connected across the gate and cathode of the controlled rectifier in order to protect the gate-cathode junction against high reverse voltages, and in this case the capacitance of the Zener diode also influences the tuned circuit formed by the core winding and the self-capacitance of the gate-cathode path.

Preferably, the magnetic cores are in the form of ferrite toroids.

In order that the invention can be fully understood, one embodiment thereof will now be described, by way of example, with reference to the accompanying drawing which illustrates a schematic circuit diagram of one form of a trigger circuit according to this invention.

Referring now to the drawing, ten ferrite toroidal cores 1 to 10 (only two of which are shown) embrace, and are spaced apart along, a single conductor 11 which is connected across a current pulse generator 12. An inductive winding is formed on each core and these windings (13 to 22) are connected across the gate and cathode electrodes of a corresponding number of thyristors 23 to 32. Zener diodes 33 to 42 are also connected across the windings 13 to 22, respectively, and thus bridge the gate and cathode electrodes of the thyristors. In turn, ten voltage sharing circuits 46 to 55, each comprising a capacitor 46A to 55A (e.g. 0.1 µf.) and a resistor 46B to 55B (e.g. 50 ohms) are connected in parallel with the ten thyristors 23 to 32, respectively, so as to ensure that the voltage across these thyristors does not exceed the maximum permissible.

In the example shown, the thyristors together with their associated Zener diodes and voltage sharing circuits are connected together in series with one another, and with a load 56, between terminals 57 and 58 of an A.C. source, but it is to be understood that the thyristors together with these associated components could be connected in parallel with one another instead, or in series-parallel.

In order to fire or trigger-on these thyristors a powerful current pulse is passed through the conductor 11 from the pulse generator 12, and a corresponding voltage pulse is induced simultaneously in all the windings 13 to 22 which appears across the gate and cathode of the corresponding thyristors.

These induced voltage pulses have a magnitude sufficient to fire the thyristor to which they are applied, and as each thyristor fires, the resulting gate-cathode short-circuit damps out any ringing, the discharging resistor-capacitor circuit initially helping to maintain conduction through the thyristor immediately following its ignition.

The firing pulses have an extremely short rise time since the current pulse applied to the primary conductor 11 is such that it has a peak value which is large compared with the current necessary to saturate the toroidal cores. The cores thus rapidly saturate and maintain this condition until the current pulse reduces approximately to zero. In addition, the stray (shown dotted) across the gate-cathode junction of each thyristor and across the corresponding Zener diode form, with the winding on the core, a tuned circuit which is arranged to resonate at the instant of saturation at a high frequency, e.g. 1 mc./s., resulting in a very steep wavefront as it is forcibly excited.

With the circuit arrangement described, a firing pulse has been observed to appear at the gate electrodes of the thyristors within 1 µs. of a current pulse being applied to the conductor 11, and in one particular experimental circuit, the chain of ten thyristors was consistently fired in 0.8 µs. which is a considerably shorter time than that taken to fire these thyristors with a conventional pulse transformer input.

Furthermore, since a powerful pulse must be applied to the conductor 11 to enable the induced voltage to have sufficient magnitude to fire the thyristors, the circuit described is not susceptible to firing by transients.

Although this invention has been described with reference to a circuit for simultaneously firing a number of interconnected thyristors, it will be understood that such interconnection is not essential and thyristors which are isolated from one another can equally well be simultaneously fired by a circuit according to this invention, and the only limitation on the actual number of thyristors which can be fired when connected in series is the high potential developed between the conductor 11 and the winding associated with the thyristor connected to the high voltage end of the chain, the accommodation of this potential being dependent on the largest ferrite cores available and the rating of the condenser bushing (not shown) which may conveniently be used to carry the conductor 11 and support the core.

We claim:
1. A circuit for firing a plurality of series and/or parallel connected controlled rectifiers comprising
 a pulse generator,
 a single conductor connected to the pulse generator,
 a plurality of magnetic cores extending around, and spaced apart along, the conductor, and
 a winding on each core inductively coupled to the conductor, wherein each of the windings is separately connected across the gate and cathode electrodes of a corresponding one of said plurality of rectifiers constituting a tuned circuit with the gate-cathode self-capacitance, whereby, in response to the application to said conductor of a current impulse of sufficient magnitude to saturate the magnetic cores, firing pulses are generated in the windings and are simultaneously applied to all the rectifiers.

2. A circuit according to claim 1 comprising a protective Zener diode connected across the gate and cathode of each controlled rectifier, the self-capacitance of said Zener diode additionally influencing the tuned circuit.

References Cited

UNITED STATES PATENTS

| 3,243,728 | 3/1966 | Braenerd et al. | |
| 3,267,290 | 8/1966 | Diebold | 307—314 |
| 3,386,027 | 5/1968 | Kilgore et al. | |

JOHN S. HEYMAN, Primary Examiner

B. P. DAVIS, Assistant Examiner

U.S. Cl. X.R.

307—314, 318